US012244705B1

(12) United States Patent
Zhang et al.

(10) Patent No.: US 12,244,705 B1
(45) Date of Patent: Mar. 4, 2025

(54) OFFLOADING COMPUTE-INTENSIVE OPERATIONS FROM REAL-TIME PROCESSOR THROUGH AN INTER-PROCESSOR QUEUE

(71) Applicant: Amazon Technologies, Inc., Seattle, WA (US)

(72) Inventors: Zhiping Zhang, San Jose, CA (US); Lindsay Renee Stewart, Seattle, WA (US); Venugopal Alatzeth, Sunnyvale, CA (US); Sudhir Venkata Dachepalli, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 18/063,585

(22) Filed: Dec. 8, 2022

(51) Int. Cl.
  *H04L 9/40* (2022.01)
  *H04L 9/08* (2006.01)
(52) U.S. Cl.
  CPC .......... *H04L 9/0866* (2013.01); *H04L 9/0825* (2013.01); *H04L 9/085* (2013.01)
(58) Field of Classification Search
  CPC ...... H04L 9/0866; H04L 9/0825; H04L 9/085
  See application file for complete search history.

(56) References Cited

U.S. PATENT DOCUMENTS

| | | | | |
|---|---|---|---|---|
| 7,382,879 B1 * | 6/2008 | Miller | ................. | G06Q 50/188 705/57 |
| 9,454,707 B1 * | 9/2016 | Tracy | ..................... | G06V 10/12 |
| 9,891,823 B2 * | 2/2018 | Feng | ..................... | G06F 3/04886 |
| 10,129,172 B1 * | 11/2018 | Stafford | ............ | G06Q 10/0833 |
| 11,151,553 B2 * | 10/2021 | Zavesky | ............ | G06Q 20/3829 |
| 2007/0162753 A1 * | 7/2007 | Nakano | ................. | H04L 9/0844 713/171 |
| 2019/0042525 A1 * | 2/2019 | McElrath | ............ | G06F 13/4291 |
| 2021/0034921 A1 * | 2/2021 | Pinkovich | ............ | G06V 10/764 |
| 2022/0382886 A1 * | 12/2022 | Guo | ........................ | G06F 21/43 |
| 2024/0095880 A1 * | 3/2024 | Liu | ........................ | G06N 3/047 |

OTHER PUBLICATIONS

S2n-tls Usage-Guide web page, retrieved from https://github.com/aws/s2n-tls/blob/main/docs/USAGE-GUIDE.md, retrieved on Mar. 3, 2023.

* cited by examiner

*Primary Examiner* — Ghodrat Jamshidi
(74) *Attorney, Agent, or Firm* — Knobbe Martens Olson & Bear LLP

(57) ABSTRACT

The present disclosure generally relates to systems and methods for initiating secure network connections at a first computing device without blocking operation of a real-time processor that handles latency-sensitive input/output (I/O) operations. In some implementation examples, the real-time processor obtains a request to establish a secure connection with a second computing device over a network. The real-time processor can enqueue into an inter-processor queue a request for performing a cryptographic operation. An additional processor can obtain the request and perform the cryptographic operation. After completing the cryptographic operation, the additional processor can enqueue information indicating the cryptographic operation is completed into the inter-processor queue. The real-time processor can obtain the information from the inter-processor queue and use the information to establish the secure connection with the second computing device.

18 Claims, 6 Drawing Sheets

OFFLOADING COMPUTE-INTENSIVE OPERATIONS FROM REAL-TIME PROCESSOR THROUGH AN INTER-PROCESSOR QUEUE

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources and data accessible to users of the data center. The data centers may be private data centers operated on behalf of an organization or public data centers operated on behalf, or for the benefit of, the general public.

The security of computing resources and associated data is of high importance in many contexts. When client computer systems communicate with computing devices operated by service providers, information may be transmitted over computer networks that are not under the direct control of either party to the communication. As such, many techniques have been developed to maintain data security, such as Transport Layer Security (TLS) and other protocols that allow secure communications over a network between computer systems through the use of cryptography. However, maintaining security while providing real-time services to users can be challenging. For example, handshake processes of the protocols often involve compute-intensive operations such as generating cryptographic keys. These operations usually tie up processing and computation resources and introduce additional latency into communications between client computing devices and data centers.

DETAILED DESCRIPTION

Figure 1:
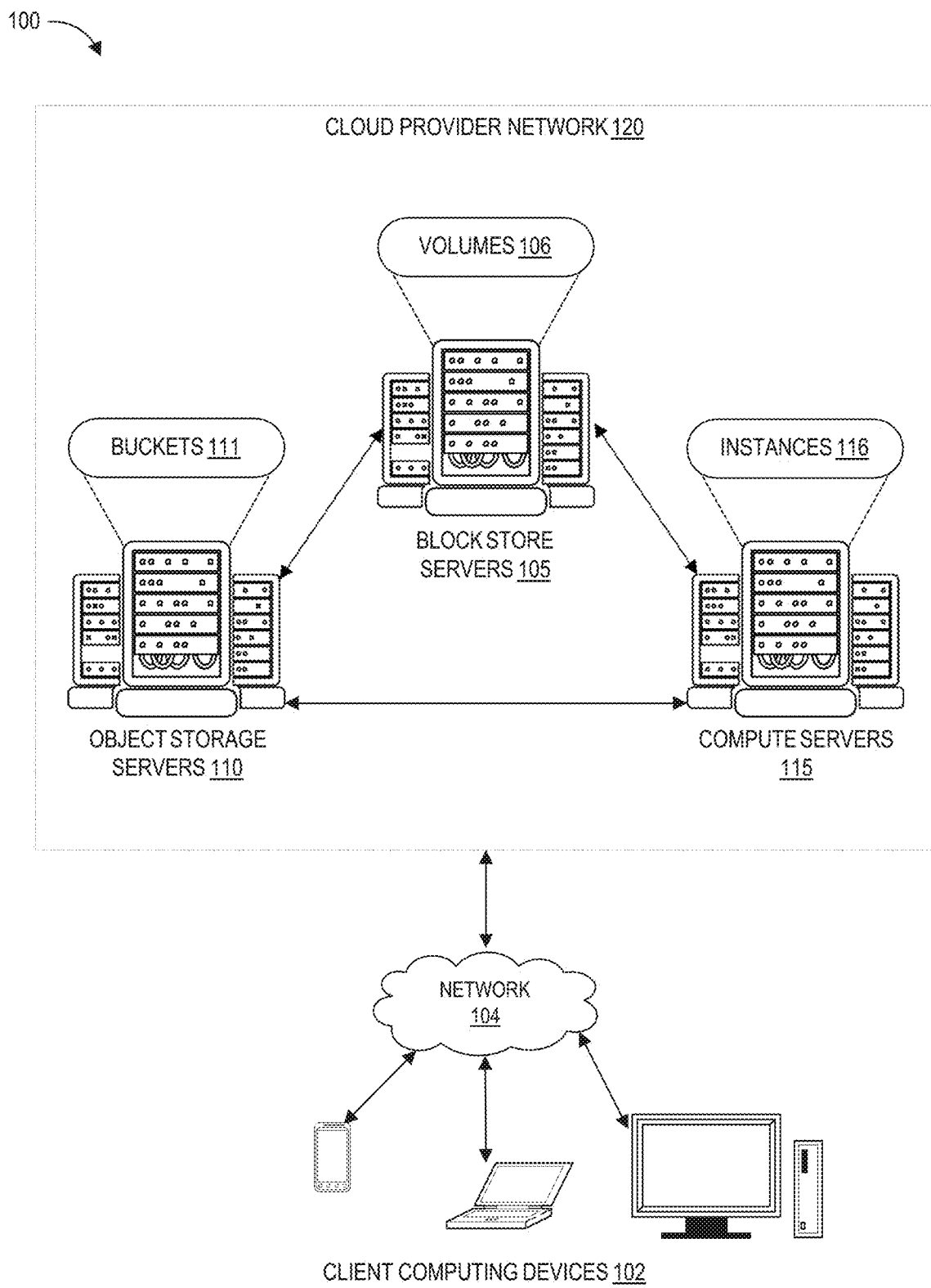
FIG. 1 depicts an example computing environment including a cloud provider network in which embodiments of the present disclosure can be implemented.

Generally described, aspects of the present disclosure relate to systems and methods for maintaining real-time responses when performing compute-intensive operations during the establishment of secure connections. Typically, real-time processors (i.e. processors that can respond to requests in a real-time manner under the applicable circumstances) are used to handle operations where real-time responses are desired, such as user input/output (I/O) operations that may be associated with users' reading and/or writing of data stored at service provider devices. Though real-time processors can provide timely responses to user I/O operations, excessive latency may result when real-time processors are also tasked to initiate secure connections because of the involvement of compute intensive operations. Specifically, when a real-time processor is tasked to perform compute-intensive operations such as generating a cryptographic key, verifying a certificate or signing a digital signature during the establishment of a secure connection, the real-time processor may be blocked for certain periods of time from handling I/O operations. Such blocking may result in undue latency to the I/O operations and poor user experiences.

To address the above problem, systems and methods that avoid blocking a real-time processing are implemented by offloading compute-intensive operations from a real-time processor to another processor (e.g. a non-real-time processor that is not responsible for latency sensitive operations and thus can be blocked by some operations) through an inter-processor queue. More specifically, when a real-time processor determines that a compute-intensive operation (e.g. generating a cryptographic key) is to be performed, the real-time processor can decline to perform the operation itself and instead can push the compute-intensive operation to an inter-processor queue (e.g. by enqueuing information needed for performing the compute-intensive operation). Another processor can then access the inter-processor queue and performs the compute-intensive operation. Once the compute-intensive operation is performed, the other processor can enqueue into the inter-processor queue information indicating that the operation has been performed along with the result, if any, of the operation that may be utilized for subsequent operations. The real-time processor may then obtain the result from the inter-processor queue, and utilize the result to continue processing dependent on that result. As such, the real-time processor is freed up from being blocked by performing compute-intensive operation and can still provide timely responses to user I/O operations when another processor performs the compute-intensive operation.

A specific use case of the present disclosure relates to establishing a secure network connection using the Transport Layer Security (TLS) protocol. Modern network-based computing often relies upon TLS to maintain secure connections between clients and servers. TLS safeguards network communications between computing devices by encrypting and decrypting data using symmetric cryptographic keys derived during the TLS handshake. Conducting the TLS handshake, however, often involves compute-intensive operations that tie up computational resources and introduces additional latency into communications. For example, during the TLS handshake, a client computing device and a server computing device securely and mutually negotiate a symmetric cryptographic key that can be used for encryption and decryption. Such negotiation often includes use of asymmetric cryptography for exchange of cryptographic material, such as a public key of the server included in a certificate of the server, a pre-master secret or other information from which one or more symmetric cryptographic keys (e.g., session keys) can be derived. During the negotiation, the client often needs to perform the operations such as verifying the certificate of the server, generating the pre-master secret and computing a session key. These operations usually involve complex arithmetic calculations that take up significant computing resources. Performing these operations by the real-time processor may block the real-time processor from responding to latency sensitive operations, such as user I/O operations. Offloading these compute-intensive operations from the real-time processor to another processor can enable the real-time processor to continue providing real-time responses to latency sensitive operations. For example, instead of computing the session key itself, the real-time processor enqueues an instruction to compute the session key along with cryptographic material from which the session key can be computed into an inter-processor queue. Another processor can then access the inter-processor queue, compute the session key in accordance with the TLS protocol and enqueue the computed session key into the inter-processor queue. The real-time processor may then obtain the session key from the inter-processor queue and use the session key to decrypt and encrypt data transmitted through the secure connection. Thus, the real-time processor is freed up from being blocked by computing the session key and can still provide timely responses to latency sensitive operations by letting another processor compute the session key.

Another specific use case of the present disclosure relates to using the TLS protocol in a cloud computing environment, such as one providing block storage devices (also referred to in various embodiments as cloud disks, managed disks, storage area network service, persistent disk service, or block volumes service) to virtual machine instances. A block storage server can provide persistent data storage in the form of block storage volumes, each of which represents a virtualized, network-accessible block-storage device (e.g. a virtual "hard disk"). The network-accessible block-storage devices may be end-user-accessible, for example by acting as a virtual storage drive for a virtual machine instance that is running on a host computing device. Users can use the host computing device to launch as many virtual machine instances as they need. Each volume on the block storage server may be "attached" (i.e. creation of a connection) to a virtual machine instance running on the host computing device. Users then can access (e.g. read and/or write) volumes on the block storage server through the connections. As users access the volumes, data are transmitted among block storage server and the host computing device. The host computing device may have to handle multiple input/output (I/O) operations associated with multiple users' access of the volumes. For better user experience of accessing block storage volumes, the host computing device needs to facilitate speedy I/O operations. As such, a real-time processor can be employed to avoid undue latency in I/O operations. On the other hand, for security concern, the connections between volumes on the block storage server and virtual machines running on the host computing device are desired to be secure connections established, for example, in accordance with the TLS protocol. When a real-time processor is handling I/O operations associated with several volumes of the server, tasking the real-time processor to initiate a new TLS connection associated with an additional volume might slow I/O operations associated with the several volumes because of the compute-intensive operations needed for establishing the TLS connection. By offloading the compute-intensive operations from the real-time processor to another processor, the present disclosure maintains speedy I/O operations while establishing additional TLS connection.

In some embodiments, a real-time processor, another processor and the inter-processor queue can be deployed on an "offload" card, such as an expansion card (e.g. peripheral component interconnect express, or "PCIe", card) installed on compute severs that provide users with on-demand access to computing resources provided by block store servers (i.e. a type of server that provide persistent data storage in the form of block storage volume, each of which represents a virtualized, network-accessible block-storage device, such as a virtual "hard disk"). With the "offload" card, when user A is sending data block through an established secure connection between the host computing device and a block store server while user B is requesting to establish another secure connection, a real-time processor can handle the I/O operations associated with user A without being blocked by compute-intensive operations associated with establishing another secure connection because another processor handles the compute-intensive operations. Once another processor completes the compute-intensive operations, it can enqueue information indicating the compute-intensive operation has been completed and the real-time processor can advance the process of establishing another secure connection to a next stage. Alternatively, the real-time processor, another processor and the inter-processor queue can be placed in a dongle that can be detachably connected to the host computing device. In some embodiments, there are more than one real-time processors in the dongle and the another processor is a non-real-time processor that is permissible to block when handling compute-intensive operations.

As will be appreciated by one of skill in the art in light of the present disclosure, the embodiments disclosed herein improve the ability of computing systems, such as compute servers for handling requests from users, to interact with network-based services. Moreover, the presently disclosed embodiments address technical problems inherent within computing systems; specifically, the limited ability of a processor to handle real-time operations and compute-intensive operations without incurring latency on time-sensitive operations. These technical problems are addressed by the various technical solutions described herein, including the use of a real-time processor to handle time-sensitive operations such as I/O operations, another processor to handle compute-intensive operations, and an inter-processor queue that allows the real-time processor to offload compute-intensive operations to another processor. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented. The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The network 104 can include any appropriate network, including an intranet, the Internet, a cellular network, a local area network or any other such network or combination thereof. In the illustrated embodiment, the network 104 is the Internet. Protocols and components for communicating via the Internet or any other types of communication networks are known to those skilled in the art of computer communications and thus, need not be described in more detail herein. Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client computing device 102 can generally refer to any device accessing a network-accessible service as a client of that service.

In FIG. 1, the cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

Turning specifically to the roles of the different servers within the cloud provider network 120, The object storage servers 110 represent a distinct type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage servers 110 facilitate storage of variable-length objects associated with a corresponding object identifier. Each object may represent, for example, a file submitted to the servers 110 by a user for storage (though the servers 110 may or may not store an object as a file).

The block store servers 105 provide persistent data storage for the compute servers 115 in the form of block storage volumes 106, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 can provide an elastic block store service of the cloud provider network 120. Data of volumes 106 may be encrypted or unencrypted. Network-accessible block-storage devices may in some cases be end-user-accessible, for example by acting as a virtual storage drive for a virtual machine instance. In other instances, network-accessible block-storage devices may not be end-user accessible, but may be used to provide services to end users. For example, one or more network-accessible block-storage devices may be used as non-accessible recovery devices, supporting recovery to end-user-accessible block-storage devices.

The block store servers 105 may include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 KB, 8 kB, 16 kB, 32 kB, 64 kB, 128 KB, 256 kB, 512 KB, or larger, depending upon the implementation.

Volumes 106, which can be treated as an individual storage drive ranging for example from 1 GB to 100 terabytes TB (or more) in size, are made of one or more blocks stored on the block store servers 105. Although treated as an individual storage drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. The block store servers 105 may have built-in redundancy for volumes by replicating the volume across multiple servers within an availability zone (e.g. a primary replica and a synchronous secondary replica), which means that volumes will not fail if an individual drive fails or some other single failure occurs. The primary and secondary replicas can support user reads and writes (input/output operations, or "I/O operations"), and thus the block store servers 105 can be accessible to the client computing devices 102 over the network 104.

The compute servers 115 may include one or more servers which provide resizable computing capacity to users for building and hosting their software systems. The compute servers 115 can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, VM instances, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data may be lost.

Once an instance 116 is launched, a volume 106 may be "attached" to the instance 116 running on the compute servers 115, and the volume 106 can further be detached from that instance 116 and re-attached to another. Attachment between a volume and an instance refers to the establishment of a connection between the instance—or other software or hardware acting on behalf of the instance—and the volume. This connection may be referred to as a "lease" in some implementations, and it enables to instance to view the volume as if it were a local storage drive, even though the volume and instance may be hosted on different physical machines and communicating over a network. Illustratively, attachment may include creation of a network connection between a volume 106 and an instance 116 (e.g., between block store servers 105 hosting the volume 106 and compute servers 115 hosting an instance 116). The network connection may correspond to a long-lived communication session, such as a transport control protocol (TCP) session. Advantageously, the network connection established is a secure connection to maintain security of communications between the compute servers 115 and the block store server 105. For example, the network connection may be encrypted via transport layer security (TLS). Attachments between multiple volumes and multiple instances as well as user I/O operations may be facilitated by the compute servers 115. For example, the compute servers 115 may be facilitating a user read-write operation between a first volume that has been attached to a first virtual machine instance while attaching a second volume to a second virtual machine instance. As discussed above, creation of a secure connection may require compute-intensive operations, such as cryptographic operations. Implementation of compute-intensive operations on a given processor may inhibit ability of the processor to timely handle other processing, such as read-write operations. Thus, embodiments of the present disclosure may utilize a multi-processor configuration to enable compute servers 115 to create secure connections without inhibiting other processing. Specifically, a compute server 115 in accordance with embodiments of the present disclosure may include a first processor configured to handle latency-sensitive operations (such as input and output to an already-attached volume 106) and a second processor configured to handle compute-intensive operations (e.g., operations that, if implemented on the first processor, would inhibit timely handling of latency-sensitive operations by the first processor). In accordance with embodiments of the present disclosure, the processors may communicate via an inter-processor queue enabling, for example, the first processor to request compute-intensive operations be conducted by the second processor.

Although the block store servers 105, the object storage servers 110 and the compute servers 115 may perform different functions in the cloud provider network 120 to serve users, the hardware architecture for implementing the block store servers 105, the object storage servers 110 and the computer servers 115 may be the same in accordance with some embodiments of the present disclosure. For example, three server computers having the same hardware architecture can be configured with three different software such that one implements block store servers 105, another implements the object storage servers 110 and the other implements the compute servers 115. As such, the same server hardware architecture can be utilized to perform all the functions provided by the block store servers 105, the object storage servers 110 and the compute servers 115. Advantageously, the hardware complexity required for building the cloud provide network 120 may be reduced by adopting common hardware for different elements of the cloud provide network 120.

Figure 2:
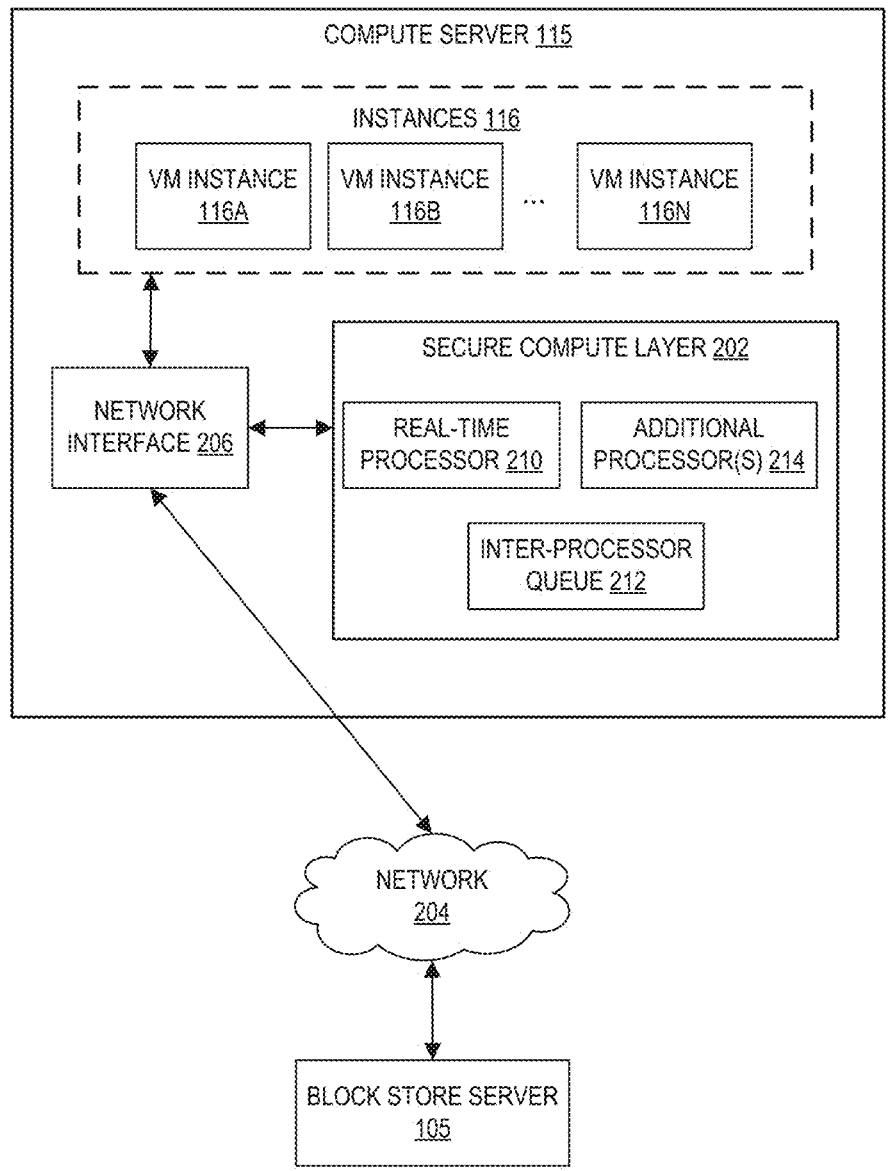
FIG. 2 depicts a logical model of connections between various elements of a compute server to handle user input/output (I/O) operations and establish network connections between virtual machine instances and a block store server.

FIG. 2 depicts a logical model of connections between various elements of a compute server 115 configured to handle user input/output (I/O) operations and establish network connections between virtual machine instances 116 (shown in FIG. 2 as instances 116A-116N) and a block store server 105 over a network 204. Specifically, the compute server 115 has one or more virtual machine (VM) instances 116, a network interface 206, and a secure compute layer 202. The VM instances 116 represent virtualized hardware executing on the compute server 115. The network interface 206 corresponds to a physical network interface that facilitates network transmission between the compute server 115 and the block store server 105.

The secure compute layer 202 illustratively represents a set of computing resources (e.g., processing and memory resources) that are isolated from the virtual machine instances 116 and thus can provide processing that is secure from interference (or view) by code executing within the VM instances 116. Illustratively, the secure compute layer 202 may be utilized to implement control plane operations on the compute server 115, such as creation, configuration, or deletion of VM instances 116. Furthermore, the secure compute layer 202 may handle data plane operations of the compute server 115 in a manner that reduces complexity of those operations from the point of view of the VM instances 116. Illustratively, the secure compute layer 202 may be configured to present a local storage device interface to VM instances 116 and to accept local mass storage protocol (e.g., serial ATA, or "SATA") operations and translate such operations into network communications submitted to the block store server 105. The secure compute layer 202 may further be configured to accept responses to the operations from the block storage server 105 (in the form of network communications) and to provide such responses via the local storage device interface to VM instances 116. Thus, the secure compute layer 202 can enable the VM instances 116 to interface with network-based storage as if that storage existed locally on the compute server 115, avoiding the complexity of implementing network-based storage protocols within the VM instances 116. While interaction with block store servers 105 are one example of a network service accessible to VM instances 116 via the secure compute layer 202, others are possible. For example, the secure compute layer 202 may be configured to present network-accessible object-storage services as a locally accessible file system, to present processing services (e.g., graphical processing unit, "GPU", processing) as a locally-accessible processing device, or to present other network-accessible services as a local interface on the compute server 115.

In one embodiment, the secure compute layer 202 is implemented by computing resources also used to provide VM instances 116. For example, the secure compute layer 202 may be implemented by one or more processors also supporting execution of VM instances 116, physical memory modules also storing data of VM instances 116, etc.

In another embodiment, the secure compute layer 202 may be provided by an "offload" card, as discussed above, such as an expansion card (e.g. PCIe card) installed on the compute server 115 that provides users with on-demand access to computing resources provided by the block store server 105. The secure compute layer 202 may also be a dongle that can be detachably connected to the compute server 115.

In accordance with embodiments of the present disclosure, the secure compute layer 202 can be configured to provide non-blocked, real-time processing to VM instances 116 using a specific configuration of multiple processors and an inter-processor queue. Specifically, as shown in FIG. 2, the secure compute layer 202 includes a real-time processor 210, one or more additional processors 214, and an inter-processor queue 212 that supports communication between the real time processor 210 and additional processors 214. Although multiple processors are illustrated in FIG. 2, embodiments of the present disclosure can alternatively be performed using multiple different cores of a single processor. For example, the real-time processor 210 may be a first core of a single processor, and the one or more additional processors 214 may be a second or more other cores of the single processor.

The real-time processor 210 may be a general processor that can provide real-time responses to a series of requests by, for example, polling or monitoring events that are occurring. In the context of the present disclosure, a "real-time" processor can refer to a processor configured to provide processing within specific time-constraints (e.g., to complete a given operation in a pre-defined amount of time). For example, a real-time processor 210 may maintain a constant processing speed (as opposed to varying in speed), may lack or disable power states (e.g., C states or P states), may guarantee operations ordering (as opposed to re-ordering operations), etc. In accordance with embodiments of the present disclosure, the real-time processor 210 may be configured to support latency-sensitive operations on the secure compute layer 202. For example, the compute server 115 and block store server 105 may be configured such that read-write operations of a VM instance 116 to a volume 106 complete in time frame similar to read-write operations on a local storage device of a given type (e.g., a solid state drive, hard disk drive, etc.). Such read-write operations may thus be considered latency-sensitive, since the introduction of latency to such operations at the secure compute layer 202 may cause such operations not to complete within the desired time frame, or may cause variance in completion time for such operations that causes inconsistent performance of a volume 106 from the point of view of a VM instance 116. The real-time processor 210 may thus be configured to handle read-write operations of VM instances 116 while introducing minimum and minimally varying latency to such operations.

In addition to the real-time processor 210, the secure compute layer 202 includes one or more additional processors 214. Additional processors 214 may have the same hardware architecture as the real-time processor 210; that is, additional processors 214 may be additional real-time processors. Alternatively, additional processors 214 may be non-real-time processors. Illustratively, there is one real-time processor 210 and one additional processor 214; however, the number of the real-time processor 210 and the additional processor 214 may be more than one depending on the computational complexity and timing constraints of the applications. In accordance with embodiments of the present disclosure, additional processors 214 may be configured to conduct compute-intensive operations on behalf of the real-time processor 210, allowing the real-time processor 210 to offload such operations to the additional processors 214 and thus avoid blocking or introduction of latency to the real-time processor 210 that might otherwise occur should the real-time processor 210 itself conduct such compute-intensive operations. For example, the additional processors 214 may be configured to conduct compute-intensive cryptographic operations associated with initiation of a secure communications channel (e.g., a TLS channel) between the compute server 115 and the block store server 105, enabling the real-time processor 210 to handle I/O operations (e.g., on already-established secure communications channels) with low latency.

To facilitate communication between the real-time processor 210 and the additional processors 214, the secure compute layer 202 includes an inter-processor queue 212 that represents a logical memory space that is accessible to both the real-time processor 210 and additional processor(s) 214. The logical memory space may be within, for example, random access memory (RAM) of the compute server 115. The underlying physical memory supporting the logical memory space may be general memory of the compute server 115 (e.g., also used to support execution of instances 116) or memory specific to the secure compute layer 202 (e.g., isolated from and inaccessible to instances 116). In some embodiments, when the real-time processor 210 determines that a compute-intensive operation is to be performed, the real-time processor 210 may decline to perform the operation itself and instead push the compute-intensive operation to the inter-processor queue 212 (e.g. by enqueuing information needed for performing the compute-intensive operation). The additional processor 214 may then access the inter-processor queue 212 and perform the compute-intensive operation. After completing the compute-intensive operation, the additional processor 214 can enqueue into the inter-processor queue 212 information indicating that the operation has been performed along with the result, if any, of the operation that may be used for subsequent operations. The real-time processor 210 may obtain the information and/or result from the inter-processor queue 212, and use the result to continue processing. With the facilitation of the inter-processor queue 212, the real-time processor 210 is freed up from being blocked by performing compute-intensive operation and can still provide timely responses to latency-sensitive operations when the additional processor 214 performs the compute-intensive operation.

As a specific example, assume the VM instance 116A has been attached to the block store server 105, resulting in a secure communications channel (e.g., a TLS-encrypted transport control protocol (TCP) session) over the network 204 between the compute server 115 and the VM instance 116A. The real-time processor 210 can facilitate I/O operations between the VM instance 116A and the block store server 105, such as by presenting the secure compute layer 202 as a locally-accessible storage device to the VM instance 116A and handling translation of I/O to or from the VM instance 116 into corresponding network calls to the block store server 105, and vice versa. The real-time processor 210 may encrypt data to be transmitted from the VM instance 116A to the block store server 105 and decrypt data received from the block store server 105 to forward to the VM instance 116A using a master session key that has been generated pursuant to applicable secure communication protocols. When another VM instance, such as VM instance 116B, requests to be attached to the block store server 105, the real-time processor 210 may initiate a secure network connection between the VM instance 116B and the block store server 105. During the establishment of the secure network connection, the real-time processor 210 may offload some compute-intensive operations (e.g. generating the cryptographic key to be used by the secure connection) to the additional processor 214 through the inter-processor queue 212. Specifically, the real-time processor 210 may enqueue instructions to perform the compute-intensive operations (e.g. generating a cryptographic key) and relevant information to the inter-processor queue 212. The additional processor 214 may then retrieve the instructions and/or retrieve relevant information from the inter-processor queue 212 to perform the compute-intensive operations. Once the additional processor 214 completes the compute-intensive operations, it can enqueue into the inter-processor queue 212 indication that the compute-intensive operations has been completed along with, if any, the computation result of the operations. As such, the real-time processor 210 will not be blocked by the compute-intensive operations related to the establishment of the secure network connection from facilitating I/O operations between VM instance 116A and the block store server 105 in a timely manner. More detailed examples illustrating the coordination between the real-time processor 210, the inter-processor queue 212 and the additional processor 214 to support real-time as well as compute-intensive operations will be discussed below.

To ensure that users' data are secured, in preferred embodiments, the secure compute layer 202 does not have access to any data transmitted between any VM instances 116A-116N and the block store servers 105. In other words, data associated with any VM instances 116A-116N do not flow into the secure compute layer 202. Rather, the network interface 206 may facilitate the exchange of these data between the VM instances 116 and the block store servers 105. A such, the secure compute layer 202 can perform its functions entirely independent of the content of I/O data any VM instances 116A-116N transmits to or receives from the block store servers 105. More specifically, as an example, the network interface 206 may merge I/O data generated by the VM instances 116 and other data (e.g. data for establishing a secure connection) generated by the secure compute layer 202 before transmitting the I/O data and the other data to the block store servers 105. When receiving data from the block store servers 105, the network interface 206 may decouple the I/O data intended for the VM instances 116 from the other data intended for the secure compute layer 202 such that the I/O data do not go into the secure compute layer 202. In some embodiments, the other data may be wrapped or encapsulated by the secure compute layer 202 before transmitting to the network interface 206, which may then access I/O data from memory locations stored by the VM instances 116 and combine the I/O data with the wrapped data generated by the secure compute layer 202 for sending to the block store servers 105. Advantageously, the privacy and security of users' data are well protected when the secure compute layer 202 does not have any access to these data.

Figure 3A:
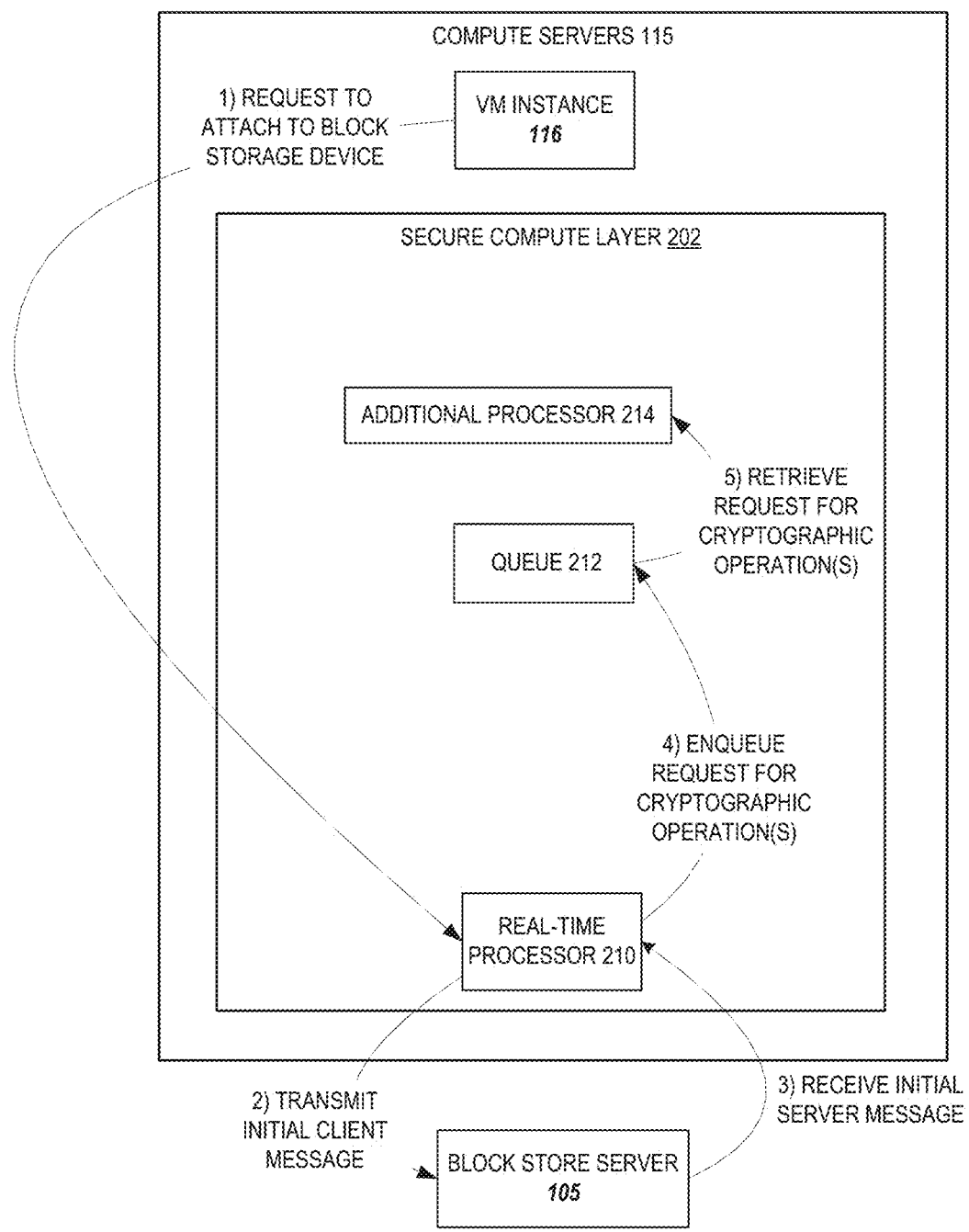
FIG. 3A depicts illustrative interactions on the compute servers of FIG. 1 to initiate a secure connection with a block store server in response to a request to establish the secure connection.
Figure 3B:
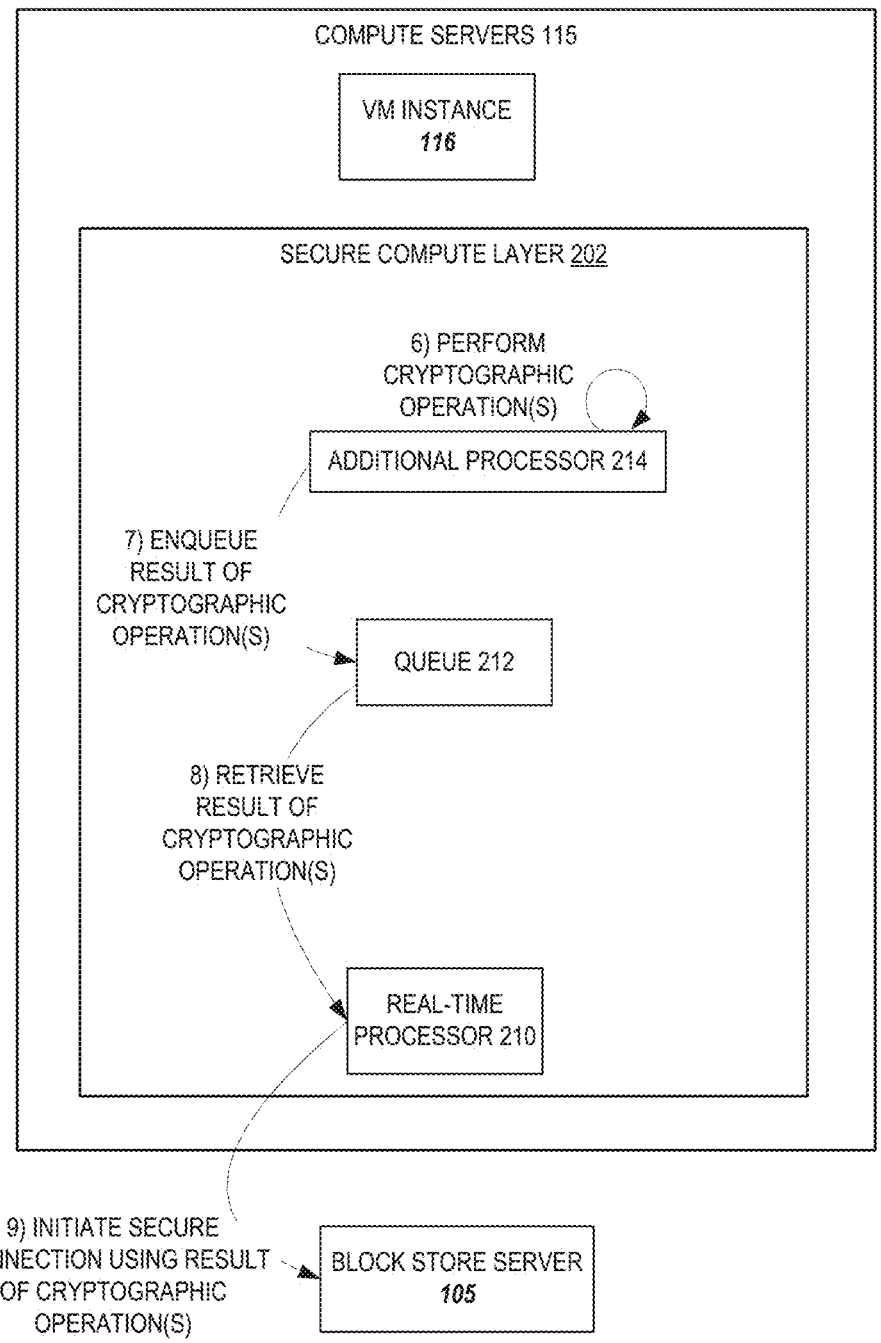
FIG. 3B depicts illustrative interactions on the compute servers of FIG. 1 to conduct cryptographic operations by an additional processor in accordance with embodiments of the present disclosure.

With reference to FIGS. 3A-B, illustrative interactions will be described depicting how elements of the secure compute layer 202 of FIG. 2 (e.g., the real-time processor 210, the additional processors 214, and the inter-processor queue 212) can provide for handling compute-intensive operations in a manner that does not result in blocking of the real-time processor 210 or incurrence of latency at the real-time processor 210 due to such compute-intensive operations. Specifically, FIGS. 3A-3B depicts illustrative interactions on the compute servers 115 of FIG. 1 to initiate a secure connection with a block store server 105 in response to a request to establish the secure connection, which initiation requires compute-intensive cryptographic operations.

The interactions of FIG. 3A begin at (1), where a VM instance 116 transmits to the real-time processor 210 a request to attach to a block storage device provided by the block store server 105. As discussed above, the secure compute layer 202 may act as a bridge between VM instances 116 and the block store server 105, enabling instances 116 to interact with the secure compute layer 202 as a local storage device while the secure compute layer 202 translates I/O of the instance 116 into corresponding network calls to the block store server 105. To ensure security of such calls, the secure compute layer 202 may be configured to respond to a request to attach a block storage device by establishing a secure connection (e.g., a TLS-encrypted TCP network communication session) with the block store server 105. The request may be triggered by a user input to the VM instance 116 or triggered automatically (e.g. during launch of the VM instance 116).

Accordingly, at (2), the real-time processor 210 transmits an initial client message to the block store server 105. The initial client message may be a ClientHello message in accordance with the TLS communication protocol for establishing a cryptographically protected communication channel over which data may be transferred between the compute servers 115 and the block store server 105. The ClientHello message may specify a set of cipher suites supported by the compute servers 115 for transmitting messages to the block store server 105 and a set of cipher suites supported by the compute servers 115 for receiving message from the block store server 105. The ClientHello message may further include a generated random number value and a list of versions of TLS protocol the compute servers 115 supports. In some embodiments, the ClientHello message may further include parameters for the block store server 105 to calculate in accordance with the TLS protocol a pre-master secret, which will be used (by the block store server 105) to generate a master session key for encrypting and decrypting data after the secure connection has been established.

At (3), the real-time processor receives an initial server message from the block store server 105. The initial server message may be a ServerHello message in accordance with the TLS communication protocol. The ServerHello message may indicate to the compute servers 115 the cipher suite(s) selected by the block store server 105. The ServerHello message may include a random number value that will be used by the compute servers 115 to generate a master session key for encrypting and decrypting data. The ServerHello message may further include a server certificate that will be used by the compute servers 115 to verify the block store server 105 is "who it says it is." The server certificate may also include information about a public key, which can be used by the compute servers 115 to encrypt message to be sent to the block store server 105 during handshake. In some embodiments, the SeverHello message further includes a server's digital signature, which can be used by the compute servers 115 to verify the integrity of the message sent. In other embodiments, the SeverHello message may include information showing that the block store server 105 has finished the operations needed on its side for the handshake process and is ready to exchange data with the compute servers 115 using a master session key in accordance with the TLS protocol.

The digital signature may refer to any information usable to cryptographically verify authenticity of a message including information generated using an RSA-based digital scheme (such as RSA-PSS), the digital signature algorithm (DSA) and the elliptic curve digital signature algorithm, undeniable digital signature schemes, and others. Further, message authentication codes (such as hash-based message authentication codes (HMACs), keyed cryptographic hash functions, and other types of information may also be used as digital signatures.

In response to receiving the initial server message, at (4), the real-time processor 210 enqueues a request for cryptographic operation(s) to the inter-processor queue 212. In some embodiments, the cryptographic operation requested is generating a master session key for encrypting and decrypting data after the handshake is completed. The real-time processor 210 may enqueue the instruction to calculate the master session key into the inter-processor queue 212 along with other information needed for the calculation, such as the random number value included in the ClientHello message, the random number value included in the ServerHello message, or a pre-master secret that has been separately calculated by the compute servers 115. In other embodiments, the request may be for performing any other operations that demand intensive computational efforts that, if performed by the real-time processor 210, may block the real-time processor 210 from processing other operations (such as user I/O operations) for which timely responses are desired.

Additionally or alternatively, the cryptographic operation requested may be verifying a digital certificate of the block store server 105 and the real-time processor 210 may enqueue the instruction to verify the certificate along with the certificate into the inter-processor queue 212. The digital certificate may be cryptographically signed by the block store server 105, and also by a certificate authority, a trusted third-party entity that verifies the identity of the block store server 105 before signing the certificate. As a result of verification, the compute servers 115 can be assured of the identity of the block store server 105. To facilitate the verification, the compute servers 115 may maintain a list of trusted certificate authorities. In other embodiments, the cryptographic operation requested may be verifying a digital signature from the block store server 105. The real-time processor 210 may enqueue the instruction to verify the digital signature along with the digital signature into the inter-processor queue 212. In some other embodiments, the cryptographic operation requested may be verifying both a digital signature from the block store server 105 and a digital certificate of the block store server 105.

Additionally or alternatively, the cryptographic operation requested may be generating an authentication information to be sent to the block store server 105. The authentication information may be a digital certificate of the compute servers 115 for the block store server 105 to verify the compute servers 115 is "who it says it is." The digital certificate may be cryptographically signed by the compute servers 115, similar to how the block store server 105 signs its certificate as described above. In other embodiments, the cryptographic operation(s) may be generating a pre-master secret and encrypting the pre-master secret with a public key included in a digital certificate of the block store server 105 in accordance with the TLS protocol. The encrypted pre-master secret will be transmitted to the block store server 105, which will use a private key to decrypt the encrypted pre-master secret. The block store server 105 may then use the pre-master secret to calculate a master session key.

In still other embodiments, the cryptographic operation may be generating the Diffie-Hellman (DH) parameter that is to be sent to the block store server 105 in accordance with the ephemeral Diffie-Hellman handshake protocol. The compute servers 115 and the block store server 105 may then separately calculate a premaster secret using the DH parameter, and then separately use the pre-master secret to calculate a master session key. As such, a private key is not needed in the process of generating the master session key.

At (5), the additional processor 214 retrieves the enqueued request for cryptographic operation(s) from the inter-processor queue 212. The request may include an instruction executable by the additional processor 214. Depending on the requested cryptographic operation(s), the additional processor 214 may also retrieve information needed for performing the operation from the inter-processor queue 212. For example, when the requested cryptographic operation is to generate a master session key, the additional processor 214 may also retrieve a pre-master secret and one or more generated random number values from the inter-processor queue 212 for calculating the master session key. In some embodiments, the real-time processor 210 may notify the additional processor 214 when an instruction for performing certain cryptographic operation or compute-intensive operation is enqueued. In response to the notification, the additional processor 214 obtains the instruction and performs the operation pursuant to the instruction. Alternatively, the real-time processor 210 may adjust a pointer of the inter-processor queue 212 indicating an instruction has been enqueued and the additional processor 214 would then obtain the instruction in response to monitoring that a value of the pointer has been changed.

In some embodiments, the inter-processor queue 212 is configured as a first-in first-out (FIFO) storage module. In other words, the requests to perform cryptographic operations are enqueued by the real-time processor 210 in a particular order and the additional processor 214 dequeues the requests from the inter-processor queue 212 following the same particular order. Each request may further include a pointer directing the additional processor 214 to a memory location for accessing relevant information for performing the corresponding cryptographic operation. The memory location that stores the relevant information can be within or without the inter-processor queue 212. For example, if the request includes an instruction to validate a digital signature from the block store server 105, the request may further point to a memory location that is commonly-accessible to the real-time processor 210 and the additional processor 214 for the real-time processor 210 to store the digital signature and the additional processor 214 to retrieve the digital signature. Alternatively, the inter-processor queue 212 can be configured in a non-FIFO manner. For example, a request that is enqueued by the real-time processor 210 later than another request may be dequeued by the additional processor 214 earlier because of urgency or other criterion. For another example, a request associated with a particular VM instance can be dequeued and processed by the additional processor 214 earlier than requests associated with other VM instances because of the higher priority of the particular VM instance.

Although only one queue 212 is illustrated in FIG. 3A and FIG. 3B, in some embodiments, two or more queues can be utilized to facilitate the off-loading of compute-intensive operations from the real-time processor 210. For example, the real-time processor 210 and the additional processor 214 may communicate with each other using two queues. The first queue may be a submission queue, which is utilized by the real-time processor 210 to enqueue data associated compute-intensive operations and utilized by the additional processor 214 to retrieve the enqueued data for performing the compute-intensive operations such that the real-time processor 210 is not blocked. Once the additional processor 214 completes the compute-intensive operations, it may utilize the second queue, e.g. a completion queue, to enqueue the results of the compute-intensive operations. The real-time processor 210 may then access the second queue to retrieve the results of the compute-intensive operations performed by the additional processor 214.

As another example, the requested cryptographic operation may be verifying a digital certificate of the block store server 105. Then, the additional processor 214 may obtain the instruction to verify the digital certificate and the digital certificate from the inter-processor queue 212. If, for example, the instruction is to verify both a digital certificate of the block store server 105 and a digital signature from the block store server 105, the additional processor 214 may obtain the digital certificate and the digital signature from the inter-processor queue 212. As discussed above, the inter-processor queue 212 may alternatively store a pointer directing to a memory location where the digital certificate and the digital signature are stored for the additional processor 214 to retrieve for verification.

With reference now to FIG. 3B, at (6), the additional processor 214 performs the requested cryptographic operations that may be specified by the instruction enqueued by the real-time processor 210. The cryptographic operation performed may be generating a master session key that is to be used for encrypting and decrypting data after the handshake process is completed. The additional processor 214 may generate the master session key using a pre-master secret, a generated random number value of a client (e.g. the compute server 115) and a generated random number value of a server (e.g. the block store server 105). The generated random number value of the server may come from the initial server message, as discussed at (3) in FIG. 3A, which may be the ServerHello message in accordance with the TLS communication protocol. In contrast, the pre-master secret and the generated random number value of the client may be generated by the compute server 115. Alternatively, the cryptographic operation performed may be verifying a digital certificate of the block store server 105. The additional processor 214 may then verify the digital certificate with the certificate authority that issued the digital certificate of the block store server 105. In other embodiments, the cryptographic operation performed by the additional processor 214 is verifying the digital signature from the block store server 105 and the additional processor 214 may then verify the digital signature in accordance with applicable protocols. In still other embodiments, the cryptographic operation performed by the additional processor 214 is verifying both the digital signature from the block store server 105 and the digital certificate of the block store server 105.

Illustratively, the cryptographic operation performed by the additional processor 214 may be signing a message using a private cryptographic key, thereby resulting in a digital signature of the message. The message and the digital signature will then be transmitted (e.g. by the real-time processor 210) from the compute servers 115 to the block store server 105 for verification. In some embodiments, the cryptographic operation performed by the additional processor 214 is generating a pre-master secret and encrypting the pre-master secret with a public key included in a digital certificate of the block store server 105. In other embodiments, the cryptographic operation performed by the additional processor 214 may be generating the Diffie-Hellman (DH) parameter that is to be sent to the block store server 105 in accordance with the ephemeral Diffie-Hellman handshake protocol.

After completing the cryptographic operation(s), at (7), the additional processor 214 enqueues the result of the cryptographic operation(s) into the inter-processor queue 212. The result may be a master session key calculated by the additional processor 214. Alternatively, the result may be an indication showing that a digital signature from the block store server 105 and/or a digital certificate from the block store server 105 has been verified, ensuring the integrity of the security of communication to the compute servers. In other embodiments, the result of the cryptographic operation may be a digital signature signed by the compute servers 115. Alternatively, the result of the cryptographic operation may be an encrypted pre-master secret or a DH parameter that are to be sent to the block store server 105.

At (8), the real-time processor 210 retrieves the result of cryptographic operation(s) from the inter-processor queue 212. In some embodiments, the additional processor 214 may adjust a pointer of the inter-processor queue 212 indicating the result of a cryptographic operation has been enqueued and the real-time processor 210 would then obtain the indication in response to monitoring that a value of the pointer has been changed. In some embodiments, the additional processor 214 may notify the real-time processor 210 when the cryptographic operation has been completed. In response to the notification, the real-time processor 210 may retrieve result, if any, of the cryptographic operation from the inter-processor queue 212. For example, when the cryptographic operation is generating a master session key in accordance with the TLS communication protocol, the real-time processor 210 obtains from the inter-processor queue 212 the generated master session key, which will be used to encrypt and decrypt data after the TLS connection has been established. As another example, the cryptographic operation may be signing a digital signature. Then, the real-time processor 210 would obtain from the inter-processor queue 212 the digital signature generated by the additional processor 214. Alternatively, when the cryptographic operation is verifying a digital certificate of the block store server 105 and/or a digital signature from the block store server 105, the real-time processor 210 may obtain from the inter-processor queue 212 information indicating that the digital signature and/or digital certificate has been verified such that the real-time processor 210 may proceed to a next stage of a handshake process. In other embodiments, the real-time processor 210 may obtain from the inter-processor queue 212 an encrypted pre-master secret, which is to be transmitted to the block store server 105 to be used for calculating a master session key.

At (9), the real-time processor 210 initiates a secure connection using the result of the cryptographic operation (s). When the cryptographic operation is generating a master session key in accordance with the TLS communication protocol, the real-time processor 210 uses the master session key to establish the TLS connection with the block store server 105. For example, the real-time processor 210 may use the session key to encrypt a message indicating that all the compute servers 115 has performed all the steps it has to for the TLS handshake process. The real-time processor 210 may then send the encrypted message to the block store server 105. Optionally, the real-time processor 210 may transmit a change cipher spec (CCS) notification to the block store server 105 indicating that the compute servers 115 is to switch from a handshake phase to a data transfer phase in accordance with the TLS communication protocol.

Alternatively, the result may be that a digital certificate of the block store server 105 and/or a digital signature from the block store server 105 has been verified. Based on the result, the real-time processor 210 may allow the progression of the handshake process and may further enqueue other instructions for the additional processor 214 to perform necessary cryptographic operations to establish a secure connection. In some instances, the result of the cryptographic operation may be a digital signature signed by the compute server 115. The real-time processor 210 then will send the digital signature to the block store server 105, which will use the digital signature to verify the integrity of the message sent by the compute servers 115.

Additionally, after the secure connection is initiated, further sensitive data can be exchanged and/or further operations can be conducted through the secure connection. For example, the compute servers 115 may exchange other encryption keys with the block store server 105 after the TLS handshake process is completed. As another example, additional handshake processes in accordance with other network communication protocols may be conducted between the compute servers 115 and the block store server 105 through the established secure connection. Advantageously, the security for exchanging additional data or conducting additional handshake processes are enhanced through the TLS secure connection.

Figure 4:
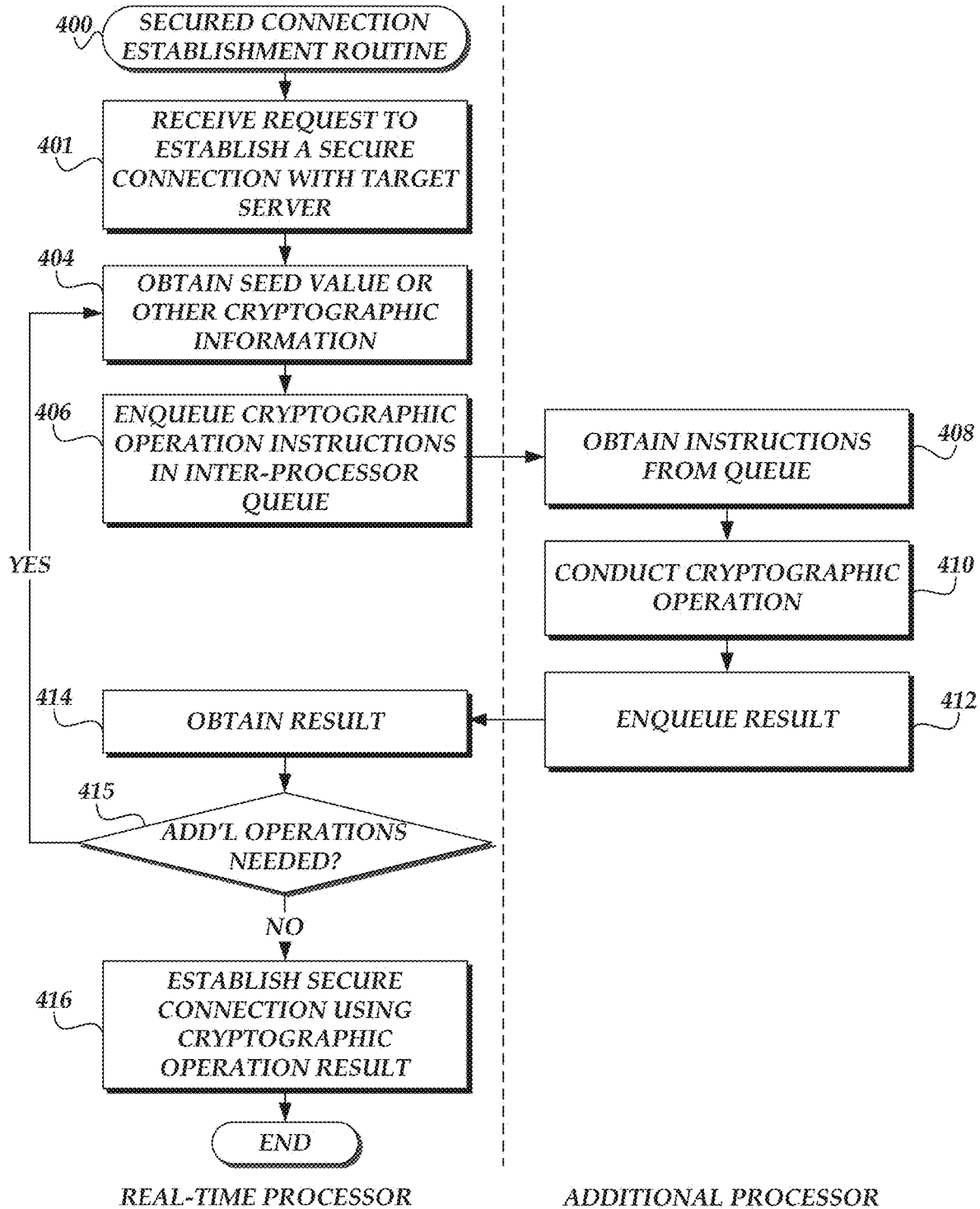
FIG. 4 depicts an illustrative routine for establishing a secure connection with a server through the coordination of a real-time processor, an additional processor and an inter-processor queue of a secure compute layer in compute servers.

With reference to FIG. 4, an illustrative routine 400 for establishing a secure connection with a server will be described. The routine 400 may be implemented, for example, by the secure compute layer 202 of FIG. 2. As described above, the routine 400 may provide for initiating a secure network connection between the compute server 115 and the block store server 105 without blocking operations of the real-time processor 210 handling latency-sensitive input/output (I/O) operations. As such, the routine 400 may be utilized to facilitate communications between one or more virtual machine instances 116 with the block store server 105, where some communications may involve latency-sensitive I/O operations and others may involve compute-intensive operations.

The routine 400 begins at block 401, where the real-time processor 210 of the secure compute layer 202 receives a request to establish a secure connection with a target server. As discussed above, the request may be generated, for example, responsive to a request to attach a block storage device to a VM instance 116. Accordingly, the target server may be the block store server 105 with which the VM instance 116 desires to communicate. Illustratively, the request may specify the particular type(s) of secure connection that the VM instance 116 wishes to establish. The request may further include other information related to the establishment of the secure connection, such as the operation (e.g. read or write a volume, etc.) that the VM instance 116 intends to conduct with on the block store server 105. While attachment to a block store server 105 is provided as an illustrative example, the routine 400 may be utilized to handle initiation of a secure connection for any variety of purposes.

At block 404, the real-time processor 210 of the secure compute layer 202 obtains cryptographic information, such as a certificate and a seed value of the target server. Illustratively, the seed value may be a random number value generated by the block store server 105. The seed value may be included in a ServerHello message along with other information (e.g. server's certificate, server's digital signature, or cipher suites selected by a server or message indicating the server has completed the handshake process on its part) in accordance with different variations of the TLS communication protocols or other applicable secure communication protocols. The seed value may be obtained, for example, in response to an initial client message transmitted by the real-time processor 210 to the block store server 105, which initial client message is in response to the request to establish a secure connection.

At block 406, the real-time processor 210 of the secure compute layer 202 enqueues cryptographic operation instruction(s) into the inter-processor queue 212. Illustratively, the cryptographic operation instruction(s) may be an instruction to generate a cryptographic key from the seed value obtained from the block store server 105. Additionally, the real-time processor 210 may further enqueue other information needed for performing the cryptographic operation. For example, in accordance with the TLS communication protocol, a random number value included in a ClientHello message, a random number value included in a ServerHello message, and a pre-master secret may also be enqueued for the additional processor 214 to retrieve.

Alternatively, the instruction may indicate to the additional processor 214 where to retrieve related information for performing the cryptographic operation such that the real-time processor 210 does not have to enqueue the information. As such, the real-time processor 210 may handle other operations not related to initiating the secure connection in a more timely manner. For example, by offloading cryptographic operations to the additional processor 214 via the inter-processor queue 212, the real-time processor 210 may continue to handle latency-sensitive operations (e.g., client I/O to block store servers 105 via an already-established secured connection) in a timely manner, without delay that might be caused by conducting the cryptographic operations on the real-time processor 210.

At block 408, the additional processor 214 obtains the instruction to perform the cryptographic operation from the inter-processor queue 212. As discussed above, depending on the specific cryptographic operation(s) to be performed, the additional processor 214 may also retrieve information needed for performing the operation from the inter-processor queue 212 or elsewhere. For example, when the requested cryptographic operation is to generate a master session key, the additional processor 214 may also retrieve a pre-master secret and one or more generated random number values from the inter-processor queue 212. The additional processor 214 may obtain the instruction to perform the cryptographic operation in response to the notification from the real-time processor 210. Alternatively, the additional processor 214 may monitor a status of the inter-processor queue 212 to know that the instruction to perform the cryptographic operation has been enqueued.

At block 410, the additional processor 214 performs the cryptographic operation pursuant to the instruction enqueued. As an example, the operation may be generating a master session key that is to be used for encrypting and decrypting data after the handshake process is completed in accordance with the TLS protocol. As discussed above, the additional processor 214 may generate the master session key using a pre-master secret, a generated random number value of a client (e.g. the compute servers 115) and a generated random number value of a server (e.g. the block store server 105). As another example, the cryptographic operation may be verifying a digital signature from the block store server 105. Then, the additional processor 214 may verify the digital signature in accordance with applicable protocols. For another example, the cryptographic operation performed by the additional processor 214 may be verifying both the digital signature from the block store server 105 and the digital certificate of the block store server 105. As still another example, the cryptographic operation performed by the additional processor 214 may be signing a message using a private cryptographic key, thereby resulting in a digital signature of the message.

At block 412, the additional processor 214 enqueues the result of the cryptographic operation. For example, the additional processor 214 may enqueue a master session key used in the TLS protocol to the inter-processor queue 212. As another example, the additional processor may enqueue an indication showing that a digital certificate of the block store server 105 and/or a digital signature from the block store server 105 has been verified. Alternatively, the additional processor 214 may enqueue into the inter-processor queue 212 a digital signature, which will be transmitted to the block store server 105 for verifying the integrity of the message sent to the block store server 105.

At block 414, the real-time processor 210 retrieves the result of the cryptographic operation(s) from the inter-processor queue 212. For example, when the cryptographic operation is generating a master session key in accordance with the TLS communication protocol, the real-time processor 210 retrieves from the inter-processor queue 212 the generated master session key, which will be used after the TLS connection has been established. Other types of results, as discussed above, may be obtained from the inter-processor queue 212 for the real-time processor to facilitate the handshake process in accordance with applicable communication protocols.

The routine 400 then varies according to whether additional compute-intensive operations are required to establish a secure connection, as determined at block 415. In the instance that additional compute-intensive operations are required, then block 415 evaluates as "Yes" and the routine 400 returns to block 404, where the real time processor 210 obtains additional cryptographic information (e.g., in response to a request transmitted to a server), enqueues instructions, and obtains a result, as described in more detail above with respect to blocks 406-414.

In one example, the number of additional cryptographic operations or iterations of the loop within the routine 400 can depend on the number of interactions taken place back and forth between the block store server 105 and the compute servers 115 during the handshake process for establishing the secure connection. More specifically, the number of interactions between the block store server 105 and the compute servers 115 may vary under different variants of the TLS communication protocol. In some embodiments, the TLS handshake process can be completed after one round-trip time (1-RTT) between the compute servers 115 and the block store server 105. For example, the compute servers 115 may transmit a ClientHello message along with some cryptographic related information (e.g. parameters used to calculate a premaster secret) to the block store server 105, which in response may transmit a ServerHello message along with some cryptographic related information (certificate of the block store server 105 and digital signature from the block store server 105) back to the compute servers 115 to complete the handshake process. During this example TLS handshake process, the compute servers 115 may perform at least two cryptographic operations: verifying the certificate of the block store server 105 and generating the master secret. As such, the routine 400 may loop back once to block 404 once before proceeding to block 416 to complete the handshake process.

In some embodiments, the TLS handshake process may be completed after two or more round trips between the compute servers 115 and the block store server 105. As another example where the TLS handshake process requires two round trip time (2-RTT) to complete, the compute servers 115 may transmit a ClientHello message to the block store server 105, which in response may transmit a SeverHello message (including a certificate of the block store server 105) to the compute servers 115. During the second round trip, the compute servers 115 may transmit some cryptographic related information (e.g. premaster secret that is encrypted with a public key of the block store server 105) to the block store server 105, which in response may transmit other cryptographic related information along with message indicating the block store server 105 has completed the handshake process on its side. During this example TLS handshake process, the compute servers 115 may perform at least three cryptographic operations: verifying the certificate of the block store server 105, encrypting the premaster secret with the public key of the block store server 105, and generating the session key which is used to transmit data after the secure link is established. As such, the routine 400 may loop back to block 404 twice before proceeding to block 416 to complete the TLS handshake process.

It should be appreciated that operations for implementing other RTT scenarios (e.g., 0-RTT where no round trip is required and the compute servers 105 may send "early data" to the block store server 115 right after sending the ClientHello message) under different TLS variants are also within the scope covered by the routine 400 in view of the availability of looping back from block 414 to block 404. In addition to situations where the routine 400 may not need to loop back after block 414, in other embodiments the routine 400 may need to loop back more than twice. For example, in the aforementioned 2-RTT TLS handshake process, the compute server 115 may perform an additional cryptographic operation to generate a certificate of its own, which will be sent to the block store server 105 for authenticating the compute server 115 when mutual TLS authentication is desired. In this example situation, the compute servers 115 may perform at least four cryptographic operations: generating a certificate of its own, verifying the certificate of the block store server 105, encrypting the premaster secret with the public key of the block store server 105, and generating the session key.

When no additional operations are required, block 415 evaluates to true, and the routine 400 proceeds to block 416 where the real-time processor 210 establishes a secure connection using the result of the cryptographic operation (s). If the cryptographic operation is generating a master session key in accordance with the TLS communication protocol, the real-time processor 210 uses the master session key to establish the TLS connection with the block store server 105. For example, the real-time processor 210 may use the session key to encrypt a message indicating that all the compute servers 115 has performed all the steps it has to for the TLS handshake process. The real-time processor 210 may then send the encrypted message to the block store server 105. Optionally, the real-time processor 210 may transmit a change cipher spec (CCS) notification to the block store server 105 indicating that the compute servers 115 is to switch from a handshake phase to a data transfer phase in accordance with the TLS communication protocol. Other types of results, as discussed above, may be used by the real-time processor to facilitate the handshake process during applicable stages of the handshake process.

After implementing the aforementioned blocks, thus establishing a secure connection involving cryptographic operations, the routine 400 ends at block 416. If executed by the secure compute layer 202 of FIG. 2, after the routine 400 ends at block 416, the secure connection between the compute servers 115 and the block store server 105 is established. As such, a VM instance 116 can communicate with the block store server 105 and conduct relevant applications/operations securely.

In some embodiments, although not shown in FIG. 4, the routine 400 may add at least another block in between block 401 and 404 to achieve mutual authentication between the compute servers 115 and the block store server 105. For example, before obtaining the seed value from the block store server 105 at block 404, the compute servers 115 may generate and transmit a certificate and/or digital signature of its own to the block store server 105. Specifically, as generation of the certificate and/or digital signature may be a compute-intensive operation, the real-time processor 210 may enqueue information needed for generating the certificate of compute servers 115 into the inter-processor queue 212 (e.g., in a manner similar to block 406, above). The additional processor 214 may then retrieve the enqueued information and generate the certificate and/or sign a digital signature before storing the certificate and/or signature back to the inter-processor 212 (e.g., in a manner similar to blocks 408-412, above). The real-time processor 210 may then transmit the certificate and/or signature as authentication information to the block store server 105 (e.g., as part of a ClientHello). The block store server 105 may then use the certificate and/or digital signature of the compute servers 115 to authenticate the compute servers 115. After the block store server 105 authenticates or verifies the compute servers 115 based on the certificate and/or digital signature, the block store server 105 may provide the seed value as discussed at block 404 to the compute servers 115. Then, at block 404, the compute servers 115 can authenticate the block store server 105 based on information received along with the seed value, such as the certificate and/or digital signature of the block store server 105. As such, both the compute servers 115 and the block store server 105 authenticates each other in accordance with the applicable communication protocols such as TLS.

Figure 5:
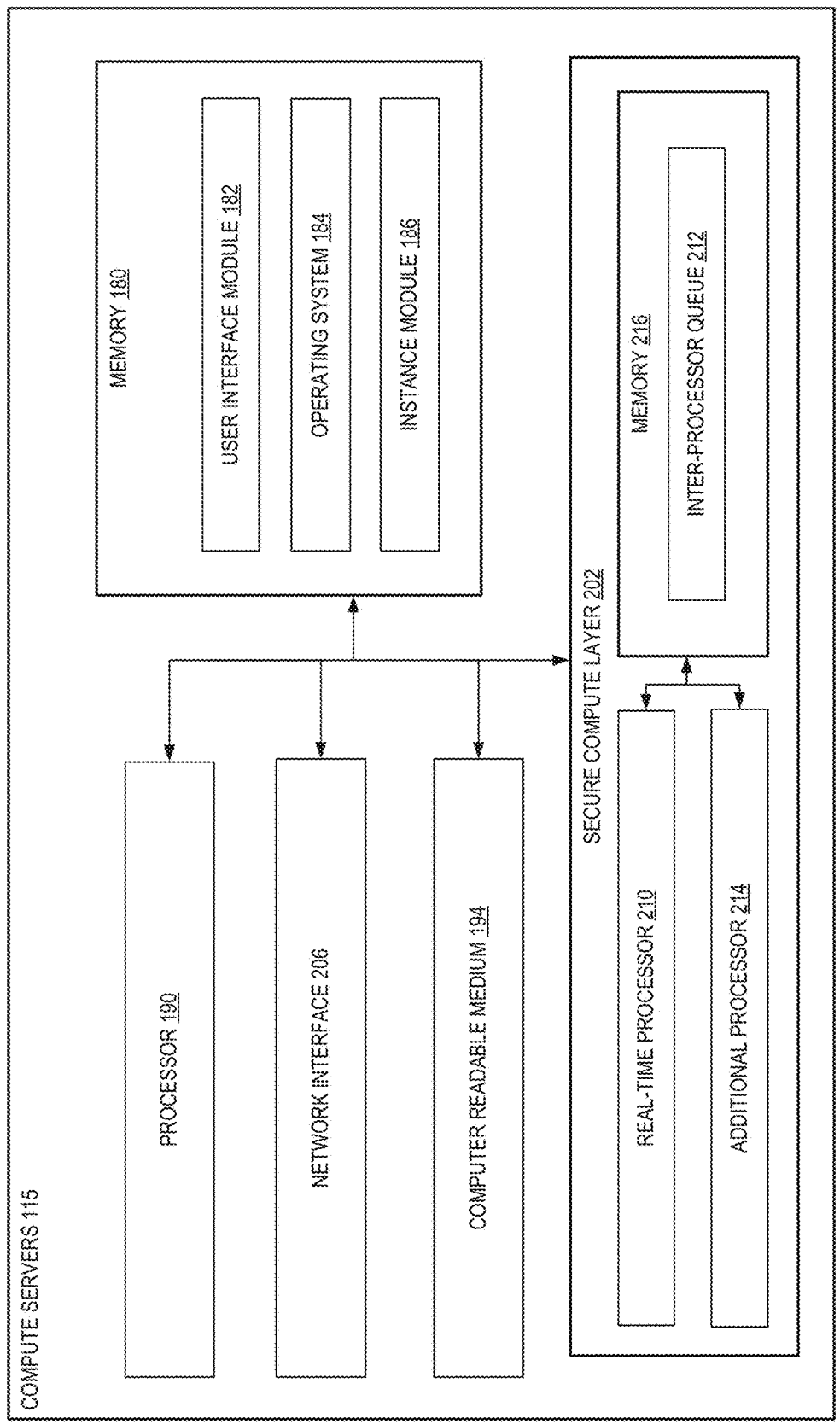
FIG. 5 depicts a general architecture of a computing device or system handling secure connection establishment in accordance with aspects of the present disclosure.

FIG. 5 depicts an example architecture of a computing system (referred to as the compute servers 115) that can be used to perform one or more of the techniques described herein or illustrated in FIGS. 1-4. The general architecture of the compute servers 115 depicted in FIG. 5 includes an arrangement of computer hardware and software modules that may be used to implement one or more aspects of the present disclosure. The compute servers 115 may include many more (or fewer) elements than those shown in FIG. 5. It is not necessary, however, that all of these elements be shown in order to provide an enabling disclosure. As illustrated, the compute servers 115 includes a processor 190, a network interface 206, and a computer readable medium 194, all of which may communicate with one another by way of a communication bus. The network interface 206 may provide connectivity to one or more networks or computing systems. The processor 190 may thus receive information and instructions from other computing systems or services via the network 104 illustrated in FIG. 1 and/or the network 204 illustrated in FIG. 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the compute servers 115. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include an instance module 186 represented code executable to host virtual machine instance, which may utilize components of the compute servers 115 (e.g., the processor 190, network interface 206, etc.) as virtualized hardware supporting execution of that instance.

The network interface 206 may commonly support one or more wireless networking protocols (e.g., Wi-Fi/IEEE 802.11, or another wireless networking standard). However, in various embodiments, network interface 206 may support communication via any suitable wired or wireless general data networks, such as other types of Ethernet networks, for example. Additionally, network interface 206 may support t communication via telecommunications/telephony networks such as analog voice networks or digital fiber communications networks, via storage area networks such as Fibre Channel SANs, or via any other suitable type of network and/or protocol.

As discussed above, such an instance (or other software executing within memory 180, particularly in the case of a "bare metal" instance) may thereafter interact with network-accessible services via interaction with the secure compute layer 202. As shown in FIG. 5, the secure compute layer 202 can include hardware isolated from other hardware of the compute servers 115. For example, the secure compute layer 202 may be implemented as an expansion card of the compute servers 115. The secure compute layer 202 can thus include a real-time processor 210, an additional processor 214, and a memory 216. The memory 216 illustratively includes an inter-processor queue 212 executable to implement aspects of the present disclosure in coordination with the real-time processor 210 and the additional processor 214, e.g., obtaining a request to establish a secure connection with a server device over a network by the real-time processor 210, performing cryptographic operations by the additional processor 214 pursuant to the instruction enqueued in the inter-processor queue 212. The memory 216 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

While FIG. 5 is depicted as the compute servers 115, a similar device may be used to implement other elements of FIGS. 1-2. For example, a device having a similar configuration when programmed with appropriate modules may be used to implement compute servers 115, block store servers 105, or object storage servers 110. Generally, embodiments of the present disclosure may use various protocols, such as an SSL or TLS protocol and extensions thereto for establishing encrypted communications sessions. Other protocols implemented below the application layer of the Open Systems Interconnect (OSI) model may also be used and/or adapted to utilized techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security, and other protocols, such as protocols for secure communication that include a handshake.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for initiating secure network connections at a first computing device without blocking operation of a real-time processor handling latency-sensitive input/output (I/O) operations, the system comprising:
   the real-time processor;
   an additional processor; and
   a memory providing an inter-processor communication queue;
   wherein the real-time processor is configured to:
      obtain a request to establish a secure connection with a second computing device over a network;
      obtain a seed value of the second computing device;
      enqueue into the inter-processor communication queue an instruction to generate a cryptographic key from the seed value of the second computing device;
      obtain from the inter-processor communication queue an indication the cryptographic key has been generated, wherein the indication identifies the cryptographic key; and
      establish the secure connection with the second computing device using the cryptographic key;
   wherein the additional processor is configured to:
      obtain from the inter-processor communication queue the instruction to generate the cryptographic key from the seed value of the second computing device;
      generate the cryptographic key from the seed value of the second computing device; and
      enqueue into the inter-processor communication queue the indication the cryptographic key has been generated.

2. The system of claim 1, wherein the inter-processor communication queue comprises a submission queue and a completion queue, and wherein:
   the real-time processor is configured to:
      enqueue into the submission queue the instruction to generate the cryptographic key from the seed value of the second computing device; and
      obtain from the completion queue the indication the cryptographic key has been generated; and
   the additional processor is configured to:
      obtain from the submission queue the instruction to generate the cryptographic key from the seed value of the second computing device; and
      enqueue into the completion queue the indication the cryptographic key has been generated.

3. The system of claim 1, wherein the additional processor is further configured to generate a seed value of the first computing device, and wherein the additional processor generates the cryptographic key from the seed value of the second computing device and the seed value of the first computing device.

4. The system of claim 3, wherein the additional processor is further configured to generate a random value, and wherein the additional processor generates the cryptographic key from the seed value of the second computing device, the seed value of the first computing device and the random value.

5. A computer-implemented method for initiating a secure network connection between a first computing device and a second computing device, wherein the first computing device comprises a first processor, a second processor and an inter-processor communication queue, the computer-implemented method comprising:
   enqueuing, by the first processor, into the inter-processor communication queue an instruction to generate a cryptographic key;
   obtaining, by the second processor, from the inter-processor communication queue the instruction to generate the cryptographic key;
   generating, by the second processor, the cryptographic key;
   enqueuing, by the second processor, into the inter-processor communication queue an indication the cryptographic key has been generated, wherein the indication identifies the cryptographic key;
   obtaining, by the first processor, from the inter-processor communication queue the indication the cryptographic key has been generated; and
   establishing, by the first processor, the secure network connection with the second computing device using the cryptographic key,
   wherein the first processor is a real-time processor.

6. The computer-implemented method of claim 5 further comprising:
   obtaining, by the first processor, authentication information of the second computing device;
   enqueuing, by the first processor, into the inter-processor communication queue an instruction to verify the authentication information;

obtaining, by the second processor, from the inter-processor communication queue the instruction to verify the authentication information;
verifying, by the second processor, the authentication information;
enqueuing, by the second processor, into the inter-processor communication queue an indication the authentication information has been verified; and
obtaining, by the first processor, from the inter-processor communication queue the indication the authentication information has been verified.

7. The computer-implemented method of claim 5 further comprising:
enqueuing, by the first processor, into the inter-processor communication queue an instruction to generate authentication information of the first computing device;
obtaining, by the second processor, from the inter-processor communication queue the instruction to generate the authentication information of the first computing device;
generating, by the second processor, the authentication information of the first computing device;
enqueuing, by the second processor, into the inter-processor communication queue an indication the authentication information of the first computing device has been generated, wherein the indication identifies the authentication information of the first computing device;
obtaining, by the first processor, from the inter-processor communication queue the indication the authentication information of the first computing device has been generated; and
transmitting, by the first processor, the authentication information of the first computing device to the second computing device.

8. The computer-implemented method of claim 5 further comprising:
encrypting, by the first processor, a first message using the cryptographic key to generate a first encrypted message; and
transmitting, by the first processor, the first encrypted message to the second computing device,
wherein the first message indicates the secure network connection has been established.

9. The computer-implemented method of claim 5, wherein the first computing device further comprises at least one processor and memory configured to execute a virtual machine instance, and wherein the first processor, the second processor and the inter-processor communication queue are isolated from the at least one processor and the memory configured to execute the virtual machine instance.

10. The computer-implemented method of claim 5 further comprising:
obtaining, by the first processor, a seed value of the second computing device,
wherein the second processor generates the cryptographic key from the seed value of the second computing device.

11. The computer-implemented method of claim 5 further comprising:
encrypting, by the first processor, a first data using the cryptographic key to generate a first encrypted data;
transmitting, by the first processor, the first encrypted data to the second computing device;
receiving, by the first processor, a second encrypted data from the second computing device; and
decrypting, by the first processor, the second encrypted data using the cryptographic key to generate a second data.

12. One or more non-transitory computer-readable media comprising instructions implementable at a secure compute layer for a host computing device, wherein the secure compute layer comprises a real-time processor, an additional processor and an inter-processor communication queue, and wherein the instructions, when implemented by the secure compute layer, cause the secure compute layer to:
enqueue, by the real-time processor, into the inter-processor communication queue an instruction to generate a cryptographic key;
obtain, by the additional processor, from the inter-processor communication queue the instruction to generate the cryptographic key;
generate, by the additional processor, the cryptographic key;
enqueue, by the additional processor, into the inter-processor communication queue an indication the cryptographic key has been generated, wherein the indication identifies the cryptographic key;
obtain, by the real-time processor, from the inter-processor communication queue the indication the cryptographic key has been generated; and
establish, by the real-time processor, a secure network connection with a second computing device using the cryptographic key.

13. The one or more non-transitory computer-readable media of claim 12, wherein the instructions further cause the secure compute layer to:
obtain, by the real-time processor, an authentication information of the second computing device;
enqueue, by the real-time processor, into the inter-processor communication queue an instruction to verify the authentication information of the second computing device;
obtain, by the additional processor, from the inter-processor communication queue the instruction to verify the authentication information of the second computing device;
verify, by the additional processor, the authentication information of the second computing device;
enqueue, by the additional processor, into the inter-processor communication queue an indication the authentication information of the second computing device has been verified; and
obtain, by the real-time processor, from the inter-processor communication queue the indication the authentication information of the second computing device has been verified.

14. The one or more non-transitory computer-readable media of claim 12, wherein the instructions further cause the secure compute layer to:
enqueue, by the real-time processor, into the inter-processor communication queue an instruction to generate an authentication information of the host computing device;
obtain, by the additional processor, from the inter-processor communication queue the instruction to generate the authentication information of the host computing device;
generate, by the additional processor, the authentication information of the host computing device;
enqueue, by the additional processor, into the inter-processor communication queue an indication the authentication information of the host computing device has been generated, wherein the indication identifies the authentication information of the host computing device;

obtain, by the real-time processor, from the inter-processor communication queue the indication the authentication information of the host computing device has been generated; and transmit, by the real-time processor, the authentication information of the host computing device to the second computing device.

15. The one or more non-transitory computer-readable media of claim 12, wherein the instructions further cause the secure compute layer to:

encrypt, by the real-time processor, a first message using the cryptographic key to generate a first encrypted message; and transmit, by the real-time processor, the first encrypted message to the second computing device, and wherein the first message indicates the secure network connection has been established.

16. The one or more non-transitory computer-readable media of claim 12, wherein the host computing device further comprises at least one processor and memory configured to execute a virtual machine instance, and wherein the real-time processor, the additional processor and the inter-processor communication queue are isolated from the at least one processor and the memory configured to execute the virtual machine instance.

17. The one or more non-transitory computer-readable media of claim 12, wherein the instructions further cause the secure compute layer to:

encrypt, by the real-time processor, a first data using the cryptographic key to generate a first encrypted data;

transmit, by the real-time processor, the first encrypted data to the second computing device;

receive, by the real-time processor, a second encrypted data from the second computing device; and decrypt, by the real-time processor, the second encrypted data using the cryptographic key to generate a second data.

18. The one or more non-transitory computer-readable media of claim 12, wherein the secure network connection is a transport layer security (TLS) connection.

* * * * *